United States Patent
Matsumura et al.

[15] 3,637,295
[45] Jan. 25, 1972

[54] ACHROMATIC LENS SYSTEM

[72] Inventors: Hiroyoshi Matsumura, Osaka-shi; Shogo Yoshikawa; Ryuji Tatsumi, both of Tokyo-to, all of Japan

[73] Assignee: Nippon Selfoc Kabushiki Kaisha (aka Nippon Selfoc Co. Ltd.), Tokyo-to, Japan

[22] Filed: Dec. 29, 1969

[21] Appl. No.: 888,947

[52] U.S. Cl. .............. 350/230, 350/175 GN, 350/232, 350/233
[51] Int. Cl. .......................... G02b 1/00, G02b 9/10
[58] Field of Search ................... 350/175 GN, 233

[56] References Cited

UNITED STATES PATENTS 3,403,348  9/1968  Askhin et al. ............. 350/175 GN X
3,486,808  12/1969  Hamblen .................. 350/175 GN X

FOREIGN PATENTS OR APPLICATIONS 473  1866  Great Britain ............... 350/175 GN

*Primary Examiner*—John K. Corbin
*Attorney*—Robert E. Burns and Emmanuel J. Lobato

[57] ABSTRACT

An achromatic lens system comprising a lens system which includes at least one lens whose refractive index changes substantially proportional to the square of the distance from a central axis of the lens toward the surface thereof and whose both end planes are perpendicular to said central axis, lenses constituting said lens system being disposed in coaxial relation so as to substantially eliminate the chromatic aberration of the lens system.

2 Claims, 2 Drawing Figures

CENTRAL AXIS

ACHROMATIC LENS SYSTEM

BACKGROUND OF THE INVENTION

The present invention relates to an achromatic lens system, and more particularly to an achromatic lens system including a lens whose refractive index changes gradually from the central axis of the lens toward the surface thereof.

Since in a single lens, a focal distance varies depending upon the wavelength of the light, which causes a chromatic aberration, a method of combining a plurality of lenses has been widely employed in the past. However, in the conventional lens, it was necessary to grind a surface of the lens into a curved surface, and it was difficult to obtain a lens having a small diameter such as a diameter less than several millimeters. Accordingly, it was very difficult to manufacture lenses with a small diameter and having no chromatic aberration.

SUMMARY OF THE INVENTION

Therefore, it is an object of the present invention to provide a lens system having no chromatic aberration and particularly a lens system having a small diameter.

It is another object of the present invention is to provide an achromatic lens system, wherein a lens system including at least one lens both end planes of which are perpendicular to a central axis of the lens and whose refractive index changes substantially in proportion to the square of the distance from a central axis of the lens toward the surface thereof and lenses constituting said lens system being disposed in coaxial relation so as to eliminate substantially a chromatic aberration of the lens system.

Other objects and characteristic features of the invention will become more apparent and more readily understandable by the following description in conjunction with the accompanying drawing in which:

FIG. 1 is a schematic end view of an achromatic lens system in accordance with the invention, and FIG. 2 is a schematic side view.

DETAILED DESCRIPTION OF THE INVENTION

Figure 1:
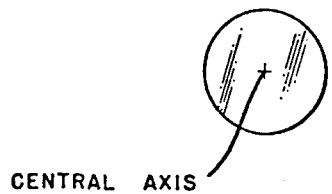
Figure 2:
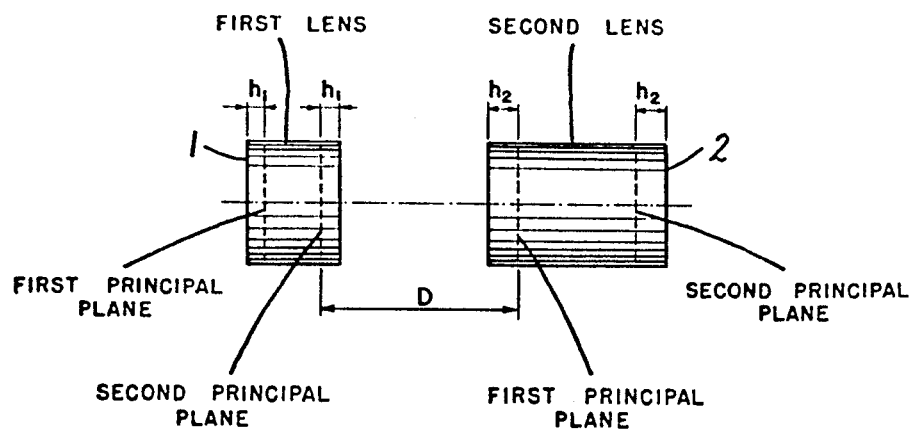

In a transparent body whose refractive index $n_D$ for the D spectral line (wavelength 589.3 m$\mu$) at a cross section perpendicular to a central axis is approximately represented by the following formula wherein $n_{oD}$ is the refractive index for the spectral line at a central axis portion, $r$ is the distance in the radial direction from the central axis and $a_D$ is a constant;

$$n_D = n_{oD}(1 - a_D r^2) \quad (1)$$

and both end planes of which are perpendicular to the central axis, the rays of light entering from the one end plane of the lens and passing through the lens is constantly curved in a direction toward the central axis in case $a_D$ is positive, and is constantly curved in such a direction as to become remote from the central axis in case $a_D$ is negative, and accordingly, this transparent body has lens function. This fact was analyzed in a dissertation prepared by Mr. S. E. Miller in a magazine titled The Bell System Technical Journal, Nov. 1956.

The focal distance $f_D$ for the spectral line of the lens is represented by the following equations wherein $t$ is the axial length of the lens;

$$\text{In case } a_D > 0, \; f_D = \frac{1}{n_{oD}\sqrt{2a_D} \cdot \sin(\sqrt{2a_D}\,t)} \quad (2)$$

$$\text{In case } a_D < 0, \; f_D = \frac{-1}{n_{oD}\sqrt{-2a_D} \cdot \sinh(\sqrt{-2a_D}\,t)} \quad (2a)$$

On the other hand, the distance $h_D$ from the first principal plane (an object side of the lens body) to the first end plane (an object side thereof) and the distance $h_D$ from the second principal plane (an image side) of the lens body to the second end plane (an image side) thereof are represented as follows:

$$\text{In case } a_D > 0, \; h_D = \frac{1}{n_{oD}\sqrt{2a_D}} \cdot \frac{1 - \cos(\sqrt{2a_D}\,t)}{\sin(\sqrt{2a_D}\,t)} \quad (3)$$

$$\text{In case } a_D < 0, \; h_D = \frac{-1}{n_{oD}\sqrt{-2a_D}} \cdot \frac{1 - \cosh(\sqrt{-2a_D}\,t)}{\sinh(\sqrt{-2a_D}\,t)} \quad (3a)$$

Although the above equations (1), (2), and (2a) are equations given for the D spectral line, the focal distances $f_C$ and $f_F$ for the rays of light having a wavelength other than the D spectral line, for instance for the C spectral line (wavelength; 626.3 m$\mu$), the F spectral line (wavelength 486.1 m$\mu$), can be similarly obtained. The chromatic aberration $\Delta f(=f_C - f_F)$ is represented by the following equation $$\Delta f = (1/A) f_D \quad (4)$$

In this equation, $A$ is Abbe's number which can be measured by the refractometer, and is represented as follows:

$$A = (n_{oD} - 1)/(n_{oF} - n_{oC}) \quad (5)$$

$n_{oC}$ and $n_{oF}$ represent the refractive index at the central axial portion of the lens for the C spectral line and the F spectral line respectively.

Assuming that two pieces of lenses 1 and 2 whose refractive index changes in proportion to the square of the distance from the central axis toward the surface thereof are provided, the focal distances of the lenses obtained by the equation (2) or (2a) and the Abbe's numbers obtained by the equation (5) are assumed as $f_1, f_2$ and $A_1, A_2$ respectively, the distance from the second principal plane of the first lens disposed at the object side to the first principal plane of the second lens disposed at the image side is represented as D, and these lenses are disposed in coaxial relation, the focal distance F of the lens which is composed for the D spectral line is represented by the following equation.

$$\frac{1}{F} = \frac{1}{f_1} + \frac{1}{f_2} - \frac{D}{f_1 f_2} \quad (6)$$

If the chromatic aberration $\Delta F$ of the composite lens is assumed as zero, the distance D is represented by the following equation.

$$D = (A_1 f_1 + A_2 f_2)/(A_1 + A_2) \quad (7)$$

Namely, if a value of D is taken as a value which is obtained from the equation (7), the chromatic aberration of the composite lens can be substantially zero. Particularly, if the values $h_D$ obtained by the equation (3) or (3a) with respect to the above two pieces of lens are taken as $h_1, h_2$ and $f_1, f_2$ and $A_1, A_2$ are selected so as to satisfy the following equation (8), $$D = h_1 + h_2 \quad (8)$$

the two lenses may be sufficient to be merely attached close to each other. Also, for instance, in case the lenses having identical refractive index distribution and made of the same glass are combined, the condition of $A_1 = A_2$ is satisfied in the equation (7), and the lenses are arranged to satisfy the following equation.

$$D = (f_1 + f_2)/2 \quad (9)$$

Since the lens whose refractive index at the cross section perpendicular to the central axis changes substantially in proportion to the square of the distance from the central axis toward the surface thereof is capable of varying a refractive index in the axial direction, it is not necessary to attach the two lenses close to each other, an achromatic lens can be obtained from one lens.

Description has been provided in the foregoing passages about the case in which two pieces of lens are combined, but in case even if more than two lenses are combined, assuming it to be the combination of two sets of lens groups and $f_1, f_2$ and $A_1, A_2$ respectively as the focal distances and Abbe's numbers for the D spectral line of the respective lens group, the relationship in the equation (7) is established as it is. Accordingly, each of the above-mentioned first lens and second lens may be lens groups which are formed by combining a plurality of lenses.

A special example of the present invention is the case where the above value D is zero, wherein the equation (7) is represented as follows:

$$A_1 f_1 + A_2 f_2 = 0 \quad (10)$$

Where $f_1$ and $f_2$ represent focal distances of lenses having different symbols, namely, one of the two lenses required to function as a convex lens and the other is required to function as concave lens. In the case of a lens whose thickness is sufficiently thin, $D=0$ means that two pieces of lens are lightly attached to each other.

According to the present invention, even though the length $t$ of the axial direction of the lens whose refractive index changes substantially in proportion to the square of the distance from the central axis toward the surface thereof is large, it is obvious that the achromatic lens system can be obtained similarly from the equation (2) or (2a).

The achromatic lens system according to the present invention contains at least one lens whose refractive index changes substantially proportional to the square of the distance from the central axis toward the surface thereof and both end planes of which are perpendicular to the central axis, but an ordinary lens both end planes of which are curved surfaces and which has a uniform refractive index may be utilized together where small diameter is not required.

In the lens whose refractive index changes substantially proportional to the square of the distance from the central axis toward the surface thereof, as it is obvious from the equation (2) or (2a), its focal distance can be changed only by changing the axial length thereof. Accordingly, the condition which satisfies the achromatism having a high resolving power and a small diameter can be obtained.

The achromatic lens system according to the present invention can be used for microscopes, telescopes, and various kinds of optical measuring means, and in addition it can be widely utilized as a long distance transmitting means for the image.

The present invention will be described with reference to the embodiments in the following:

EMBODIMENT 1

When a glass rod having a length of about 100 mm. and a diameter of 1 mm. with a composition of 48 weight percent of $SiO_2$, 16 weight percent of $Tl_2O$, 12 weight percent of $Na_2O$ and 24 weight percent of PbO was immersed in molten potassium nitrate for a predetermined period of time, a refractive index $n_{0D}$ at the central axis portion of the rod for the $D$ spectral line was 1.601, a refractive index at the surface thereof was 1.551 and a refractive index distribution $n_D$ between them was a value sufficient to satisfy substantially the equation (1). Now the value of $a_D$ was 0.125 mm.$^{-2}$ and this lens was called lens A.

Next, when a glass rod having a length of about 100 mm. and a diameter of 1 mm. with a composition of 49 weight percent of $SiO_2$, 30 weight percent of $K_2O$, 14 weight percent of $Na_2O$ and 7 weight percent of $B_2O_3$ was immersed in molten thallium chloride for a predetermined period of time, a refractive index $n_{0D}$ at the central axis portion of the rod for the $D$ spectral line was 1.50, a refractive index at the surface thereof was 1.57 and a refractive index distribution $n_D$ between them was a value sufficient to substantially satisfy the equation (1). Now the value of $a_D$ was $-0.187$ mm.$^{-2}$ and this lens was called lens B.

Both end planes of the lens A and lens B were cut and ground so that their axial lengths became accurately 12.80 mm. and 0.29 mm. respectively and both end planes became perpendicular to the central axis. The value $f_D$ of the lenses A and B became 10.73 mm. and $-6.14$ mm. respectively from the equation (2) or (2a), and the distance $h_D$ of the lenses A and B from the first end plane of the lens to the first principal plane thereof became 0.07 mm. and 0.10 mm. respectively from the equation (3) or (3a). Also, the Abbe's number $A$ of the lenses A and B which were calculated from glass compositions were 32.76 and 54.84 respectively, and therefore the distance $D$ from the second principal plane of the lens A to the first principal plane of the lens B became 0.17 mm. from the equation (7).

Since the relationship of the equation (8) was established between the value $h_D$ and $D$ in the present embodiment, it becomes obvious that there is no chromatic aberration when the lenses A and B are used by attaching them closely to each other. When white light was caused to pass through the lens which was prepared by bonding both end planes thereof with the use of Canada balsam so that the central axes of the lenses A and B became coincident with each other, there was no chromatic aberration. In addition, the focal distance of the composite lens was $-14.91$ from the equation (6).

EMBODIMENT 2

When a glass rod having a length of about 100 mm. and a diameter of 1 mm. with a composition of 48 weight percent of $SiO_2$, 16 weight percent of $Tl_2O$, 12 weight percent of $Na_2O$ and 24 weight percent of PbO was immersed in molten potassium nitrate for a predetermined period of time, a refractive index $n_{0D}$ at the central axis for $D$ spectral line was 1.601, a refractive index at the surface thereof was 1.551 and a refractive index distribution $n_D$ between them substantially satisfied the equation (1), thus the value $a_D$ was 0.125 mm.$^{-2}$.

The glass rod was cut into two pieces and each end plane of them was ground so that each axial length of lenses A and B became accurately 12.60 mm. and 2.00 mm. respectively and both end planes became perpendicular to the central axis. The value $f_D$ of lenses A and B were 74.36 mm. and 1.48 mm. respectively from the equation (2) or (2a), and the distance $h_D$ from the first end plane of the lens to the first principal plane thereof were 0.01 mm. and 0.68 mm. respectively from the equation (3) or (3a). Since the Abbe's numbers of the lenses A and B are equal, the distance $D$ from the second principal plane of the lens A to the first principal plane of the lens B became 37.92 mm. from the equation (7). It is obvious that the lens which was made by combining lenses A and B with the distance, between both end planes, 37.23 mm. which is obtained by subtracting the total of the value $h_D$ of the lenses A and B from the value $D$ has chromatic aberration.

The lens whose component lenses A and B were disposed in spaced relation with a distance of 37.23 mm. between both end planes so that the central axes thereof might coincide each other has chromatic aberration. The focal distance of the composite lens was 2.91 mm. from the equation (6).

We claim:

1. An achromatic lens system comprising a first lens whose focal distance and Abbe's number are respectively $f_1$ and $A_1$ and a second lens whose focal distance and Abbe's number are respectively $f_2$ and $A_2$, at least one lens of both of the first lens and second lens having a refractive index which changes substantially proportionally to the square of the distance from the central axis of the lens toward the surface thereof and whose both end planes are perpendicular to said central axes, the first lens and second lens being disposed in a coaxial relation so that the distance $D$ from the second principal plane of the first lens to the first principal plane of the second lens substantially satisfies the following equation:

$$D = (A_1 f_1 + A_2 f_2)/(A_1 + A_2).$$

2. An achromatic lens system according to claim 1, in which both of said lenses have a refractive index which changes substantially proportionally to the square of the distance from the central axis of the lens toward the surface thereof, said first and second lenses being attached closely so as to substantially satisfy the following equation:

$$h_1 + h_2 = (A_1 f_1 + A_2 f_2)/(A_1 + A_2)$$

where $h_1$ is a distance from the first principal plane of the first lens to the first end plane thereof, and $h_2$ is a distance from the first principal plane of the second lens to the first end plane thereof.

* * * * *